Feb. 3, 1970    N. T. CASTELLUCCI    3,492,792
PROCESS AND APPARATUS FOR GAS CHROMATOGRAPHY
Filed Sept. 11, 1968    2 Sheets-Sheet 1
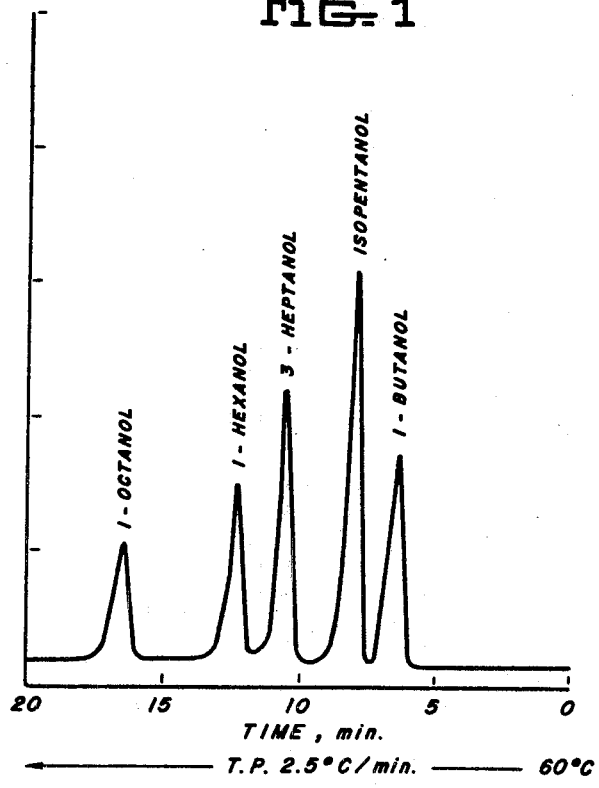
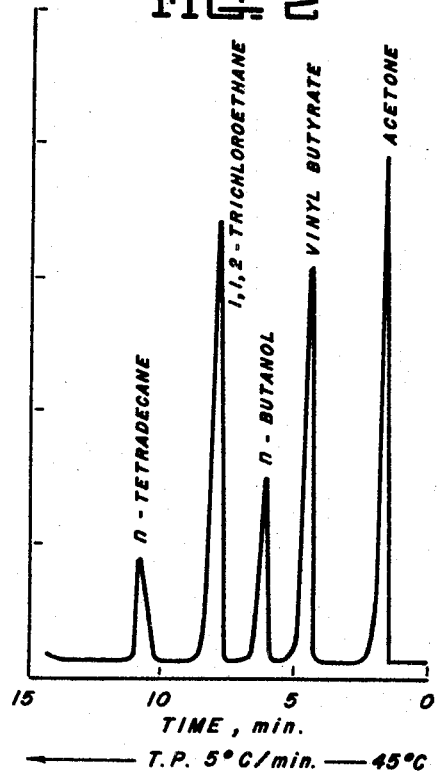
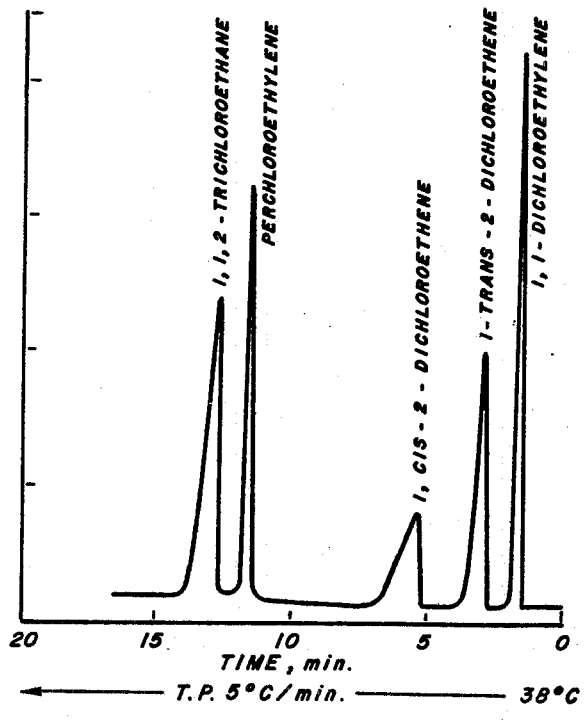
INVENTOR.
NICHOLAS T. CASTELLUCCI
BY Stanley J Price
his   Attorney

INVENTOR.
NICHOLAS T. CASTELLUCCI

United States Patent Office 3,492,792
Patented Feb. 3, 1970

3,492,792
PROCESS AND APPARATUS FOR GAS
CHROMATOGRAPHY
Nicholas T. Castellucci, Pittsburgh, Pa., assignor to
Pittsburgh Corning Corporation, Pittsburgh, Pa.,
a corporation of Pennsylvania
Filed Sept. 11, 1968, Ser. No. 759,021
Int. Cl. B01d 55/08
U.S. Cl. 55—67             8 Claims

ABSTRACT OF THE DISCLOSURE

Gas chromatography separation can be carried out in a process in which the solid supports are spherical cellular glass nodules. The cellular glass nodules have a cellular core formed of a multitude of separate closed cells and a substantially continuous outer skin. The outer skin of the nodule has a different composition than the glass core and particles of aluminum oxide are imbedded in the outer skin of the nodule. The nodule has a bulk density of between 25 and 40 pounds per cubic foot and can be made in various sizes. The nodules coated with a liquid substrate separates compounds without functional groups and provides symmetrical peaks. Certain other compounds, for example polar materials without high active protons, can also be separated. The cellular glass nodules can be silanized and used to separate compounds having active protons and materials with high permanent dipoles.

BACKGROUND OF THE INVENTION

Field of the invention

This invention relates to a process and apparatus for chromatographic separation and more particularly to a solid support for a liquid substrate in chromatographic separation apparatus.

Description of the prior art

Many materials have been used in the past as solid supports for a liquid substrate in chromatographic columns. Materials such as diatomaceous earth, fire clay and glass spheres are used presently in chromatographic columns. The diatomaceous earth and fire clay and other irregular solid supports have limitations in that this type of solid support, coated with a liquid substrate produces fines during the separation process. The gas passing through the column exhibits high pressure drops and flow rates are also limited.

Problems are encountered with the glass spheres in obtaining an even coating of the substrate on the sphere surface. It has been found that the liquid substrate accumulates at the points of contact between adjacent spheres and thus increases the pressure drop of the gas passing through the column and reduces the separating efficiency of the column. The liquid substrate coating on the glass spheres is highly viscous and the coated glass beads tend to agglomerate. Substantial pressure must be exerted on the agglomerated glass beads to pack and uniformly fill the columns with this type of solid support.

There have been suggestions in the literature of abrading the glass sphere surface to reduce the accumulation of the liquid substrate at the points of contact between adjacent spheres. It has also been suggested to coat the beads with finely divided particulate materials such as diatomaceous earth and silica. While it is reported that such treatment improves efficiency, the degree of improvement is generally small. The problem also remains of uniformly packing the column with the agglomerated spheres.

U.S. Patent No. 3,347,020 discloses the use of an open celled foam produced from high molecular weight polymers as the solid substrate. It is stated that the open celled foam provides a large surface area for separation. There are limitations with organic supports in that they cannot be used for the separation of high boiling materials because of thermal degradation. The solid support should be thermally stable and not degrade or flow at elevated temperatures.

SUMMARY OF THE INVENTION

This invention relates to an improved process and apparatus for gas-liquid chromatography separation. The process includes the use of lightweight spherical supports each having an undercoating of an active pulverulent material imbedded in the outer skin and an outer coating of a liquid substrate. This combination of coatings provides improved separating efficiency in the column for selected compounds. For certain other separations, the spherical supports with the undercoating of active pulverulent material may be silanized and then coated with the liquid substrate.

Accordingly, the principal object of this invention is to provide a cellular spherical solid support for use in gas-liquid chromatography that provides improved separating power.

Another object of this invention is to provide a lightweight cellular spherical solid support that has a low HETP over a large flow range.

A still further object of this invention is to provide a spherical cellular solid support for use in gas-liquid chromatography processes that remains free flowing after being coated with a liquid substrate and may be easily packed in relatively narrow columns.

These and other objects and advantages of this invention will be more completely disclosed and described in the following specification, the accompanying drawings and the appended claims.

BRIEF DESCRIPTION OF THE DRAWINGS

FIGURE 1 is a chromatogram of the separation of alcohols on silanized glass nodules having a size between 60 and 80 mesh coated with 5 weight percent Carbowax 20M liquid substrate.

FIGURE 2 is a chromatogram illustrating the separation of a mixture containing polar and nonpolar compounds on silanized glass nodules having a size between 60 and 80 mesh and coated with 5 weight percent Carbowax 20M liquid substrate.

FIGURE 3 is a chromatogram illustrating the separation of chlorinated hydrocarbons on unsilanized glass nodules having a size between 80–100 mesh coated with 3.8 weight percent Apiezon L liquid substrate.

DESCRIPTION OF THE PREFERRED EMBODIMENT

Figure 6:
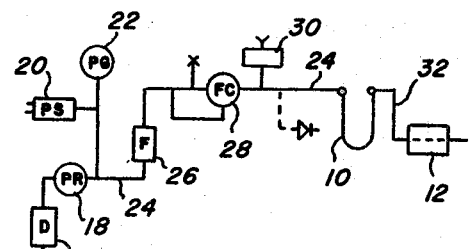
FIGURE 6 is a flow diagram schematically illustrating the apparatus.

The gas chromatographic data were obtained with a Micro Tek model 2500 instrument equipped with a thermal conductivity detector. The chromatograms were made under either isothermal or linear programmed temperature conditions. The column indicated by the numeral 10 in FIGURE 6 was constructed of stainless steel tubing with a 5.2 millimeter internal diameter and 1219 millimeter length. The thermal conductivity detector is indicated schematically in FIGURE 6 by the numeral 12. Gas enters the septum inlet 14 and flows through a drier 16 and the gas pressure is regulated by a pressure regulator 18. Pressure switch 20 and pressure gauge 22 are connected to the conduit 24 downstream of pressure regulator 18. The gas flows through conduit 24 into a flow meter 26 and then through a flow controller 28. A micro universal inlet system 30 permits the sample to be taken up with the gas flow through the conduit 24 to the previously described column 10. The gas and elutriated compounds flow through the conduit 32 to the thermal conductivity detector 12.

Various compounds were separated in the column 10 utilizing different solid supports for the liquid substrate. The separating power and the pressure drops were measured for various solid supports such as cellular glass nodules, smooth glass spheres, and diatomaceous earth.

The cellular glass nodules used as the solid support for the liquid substrate in column 10 were made according to the process described in U.S. Patent No. 3,354,024. Briefly, this process comprises admixing pulverulent borosilica or soda-lime glass and a carbonaceous cellulating agent. This admixture is wetted with a sodium silicate solution and is pelletized to form pellets of a preselected size. The sodium silicate serves both as a binder and as a glass fluxing agent. The pellets are dried and during the drying process the sodium silicate migrates toward the pellet outer surface. The dried pellets are thereafter mixed with about 1 part by weight pulverulent hydrated aluminum oxide ($Al_2O_3 \cdot 3H_2O$) to between about 10 to 30 parts by weight pellets. The hydrated aluminum oxide has a size less than 2 microns and preferably less than 1 micron and serves as a glass former and a parting agent during cellulation. Pellets coated with the aluminum oxide are introduced into a rotary kiln and subjected to an elevated temperature where they expand and cellulate. It is believed that the sodium silicate on the outer surface of the pellet reacts with the aluminum oxide to form a viscous continuous skin of high alumina glass that entraps the gasses generated during the cellulation process to form cellular glass nodules of low density. It has been found that particles of unreacted aluminum oxide are imbedded in the outer continuous skin while the outer surface of the pellet is soft during cellulation. The outer surface of the cellular glass nodules is relatively irregular with the particles of unreacted alumina imbedded therein. During cellulation the pellets increase in volume to between 2 and 10 times their size and the size distribution of the cellular glass nodules can be easily controlled.

The various solid supports were coated with the same liquid substrate to compare the separating power and pressure drops of the various supports. For the separation of certain compounds, Apiezon L was used as the liquid substrate and for the separation of other compounds Carbowax 20M was used as the liquid substrate. All the solid supports were coated with the liquid substrate by adding 0.6 gm. of the substrate dissolved in a suitable solvent to 34 ml. of the solid support. The constituents were thoroughly mixed and subjected to an elevated temperature to evaporate the solvent. In this manner a column packed with the substrate had substantially equal density of substrate per length of column. The cellular glass nodules and the diatomaceous earth solid supports were introduced into a coiled column. One end of the column was attached to a vacuum system and the solid support with the liquid substrate coating was poured into the open end of the column and vibrated to insure uniform packing free of voids. The glass spheres coated with the substrate were packed into a linear column by adding small portions of the solid support until the solid support plugged the opening in the column. The column was then subjected to a gas pressure to push the plug downwardly into the column. The packed column was then coiled to fit the apparatus.

The cellular glass nodules coated with the liquid substrate remained free flowing and were easily packed in the column. The glass spheres coated with the liquid substrate tended to agglomerate and difficulty was encountered in filling the column with the coated glass spheres.

For the separation of certain compounds, the cellular glass nodules were first silanized before they were coated with the liquid substrate. 93.4 gr. of dry cellular glass nodules were introduced into a flask containing 500 ml. of dry toluene. 50 ml. of dichlorodimethylsilane dissolved in 200 ml. of dry toluene was added to the flask. The mixture was refluxed for two hours and cooled to room temperature in an inert atmosphere. Isopropyl alcohol was added to the admixture and refluxed for approximately one hour and the reaction mixture allowed to stand at room temperature for an additional twelve hours. The mixture was cooled and filtered and the silanized nodules were washed with toluene. The solvent was thereafter removed and the silanized nodules were thereafter coated with a liquid substrate.

The following examples are provided to illustrate the invention and are not intended to limit its scope.

EXAMPLE I

The above described column was packed with cellular glass nodules having a size between 80 and 100 mesh coated with .13 gr./ft. of Apiezon L liquid substrate to provide 3.8 percent by weight of liquid substrate on the solid support. Using Decane as solute, both the pressure drop and HETP values were measured with a flow rate of inert carrier gas of 30 ml./min. The column experienced a pressure drop of 4.0 lb./sq. in. The HETP measured in accordance with the theory of Van Deemter was 0.16 cm.

EXAMPLE II

Under substantially the same conditions and with the same apparatus the solid support was flux calcined diatomaceous earth having a size between 80 and 90 mesh. The pressure drop in the column was 5.0 lb./sq. in. and the HETP was 0.34 cm. The comparative separating power and pressure drops for cellular glass nodules and diatomaceous earth are shown in Table I.

TABLE I.—HETP DETERMINATIONS USING DECANE AS SOLUTE

|  | 80/100 mesh cellular ceramic nodules | 80/90 mesh flux calcined diatomaceous earth |
| --- | --- | --- |
| Amount of substrate, gm./ft., Apiezon (L) | 0.13 | 0.13 |
| Weight percent of substrate | 3.8 | 4.8 |
| Flow of He carrier, ml./min | 30.0 | 31.0 |
| Pressure drop in lb | 4.0 | 5.0 |
| HETP, cm | 0.16 | 0.34 |

EXAMPLE III

Using the previously described apparatus, unsilanized cellular ceramic nodules having a size between 40 and 60 mesh were coated with 5.5 weight percent Apiezon L to provide 0.10 gm./ft. of liquid substrate on the cellular glass nodule solid support. Using helium as the carrier gas at a flow rate of 39 ml./min. and using Decane as the solute, the pressure drop in the column was 0.05 lb./sq. in. The HETP was 0.39 cm.

EXAMPLE IV

Under substantially the same conditions, smooth glass spheres having a size between 40 and 60 mesh were coated with 1.2 weight percent of Apiezon L substrate and the measured pressure drop of the column was 1.5 lb./sq. in. and the calculated HETP was 0.85 cm. The comparative results of Examples III and IV are illustrated in Table II.

TABLE II.—HETP DETERMINATIONS USING DECANE AS SOLUTE

| | 40/60 mesh cellular ceramic nodules unsilanized | 40/60 mesh glass spheres |
|---|---|---|
| Amount of substrate, gm./ft., Apiezon (L) | 0.10 | 0.15 |
| Weight percent of substrate | 5.5 | 1.2 |
| Flow of He carrier, ml./min | 39.0 | 31.0 |
| Pressure drop in lb | 0.05 | 1.5 |
| HETP, cm | 0.39 | 0.85 |

EXAMPLE V

Figure 4:
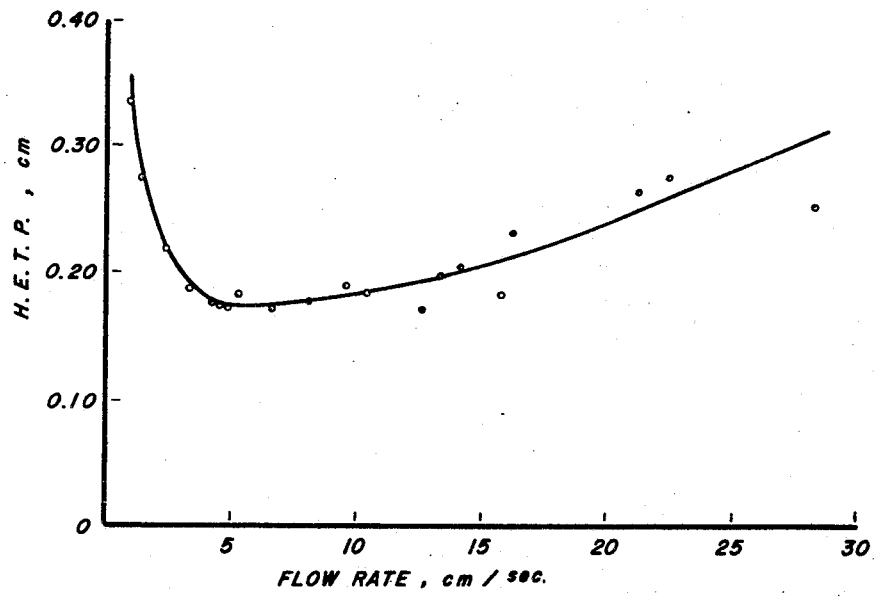
FIGURE 4 is a plot of the HETP for cyclohexane at various flow rates with unsilanized cellular glass nodules having a size between 40 and 60 mesh as the solid support and coated with about 5.5 weight percent of Apiezon L liquid substrate.

Using the above described apparatus and cellular glass nodules as the solid support coated with Apiezon L liquid substrate the HETP for cyclohexane was determined at various flow rates. FIGURE 4 illustrates graphically the HETP at various flow rates. The HETP remains stable over a relatively wide range of flow rates and indicates maximum separating power of 0.17 cm. HETP units at a flow rate of about 4 cm./sec. and a minimum of 0.19 cm. HETP units at a flow rate of about 15 cm./sec.

EXAMPLE VI

Figure 5:
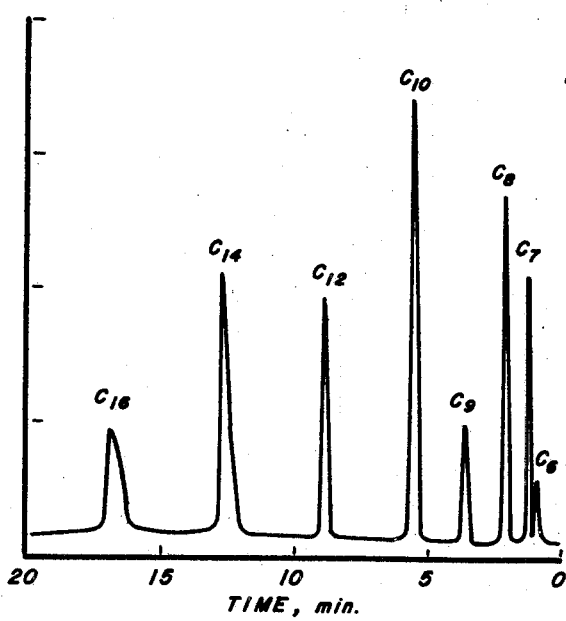
FIGURE 5 is a chromatogram illustrating the separation of C6 to C16 normal paraffins on a solid support of unsilanized spherical cellular glass nodules having a size of between 80 to 100 mesh and coated with 3.8 percent Apiezon L liquid substrate.

Using the previously described apparatus and unsilanized cellular glass nodules having a size of between 80 and 100 mesh as the solid support and coated with 3.8 weight percent of Apiezon L liquid substrate the normal paraffins were separated. The volume injected was 5 microliters. The results are shown in FIGURE 5.

EXAMPLE VII

Using the previously described apparatus, a mixture of alcohols were separated with silanized glass nodules having a size between 60 and 80 mesh and coated with 5 weight percent Carbowax 20M liquid substrate. The volume injected was 2 microliters. The results are shown in FIGURE 1.

EXAMPLE VIII

A mixture containing both polar and nonpolar compounds were separated on the same sized solid substrate as Example VII, coated with the same weight percent Carbowax 20M. The volume injected was 2 microliters. The results are shown in FIGURE 2.

EXAMPLE IX

An admixture of chlorinated hydrocarbons were separated using unsilanized cellular glass nodules of a size between 80 and 100 mesh coated with 3.8 weight percent Apiezon L and the volume injected was 2 microliters. The results are shown in FIGURE 3. It should be noted, although perchloroethylene (B.P. 121° C.) is a higher boiling material than 1,1,2-trichloroethane (B.P. 113° C.), yet the perchloroethylene eluted first. It is believed the aluminum hydrate particles on the cellular glass nodules are active and provide a retarding activity in a number of separations. The perchloroethylene does not display a dipole movement and is not as easily polarized as 1,1,2-trichloroethane. This retarding activity, or a reversal, can be used for the separation of isomers that display different magnitudes of polarizability and have rather close boiling points. Thus, with the solid support of the instant application, special selectivity processes can be accomplished.

The cellular glass nodule solid supports of the instant invention are more versatile than known solid supports of the prior art in that the cellular glass nodules coated with a liquid substrate remain free flowing and may be uniformly packed in relatively narrow columns.

All percents in this application are percents by weight, and all mesh sizes are Tyler Standard Screen sizes. The HETP was calculated according to the theory of Van Deemter.

Apiezon L is the trademark of the Vickers Electrical Co., Ltd., sold by the James G. Biddle Co., 1316 Arch Street, Philadelphia, Pennsylvania. It is a paraffin base fraction of petroleum, has a pressure at room temperature of about $1 \times 10^{-10}$ to $1 \times 10^{-11}$ mm. Hg and a melting point of 47° C., and is generally classified as a grease for sealing of ground joints.

Carbowax 20M is the Union Carbide Co. trademark for polyethylene glycol compounds that have estimated molecular weight of 15,000 to 20,000 and is synthesized by joining polyethylene glycol 6000 molecules with a di-epoxide. It has a softening point of between 50 and 55° C. and a viscosity of 450,000 Saybolt seconds at 210° F.

I claim:

1. In a process for separating vaporous mixtures of chemical compounds by passing the vaporous mixtures and an inert carrier gas through an elongated column containing substantially spherical packing elements, the improvement comprises as the spherical packing elements cellular glass nodules having a cellular core formed from a plurality of separate closed cells and a substantially continuous outer skin, said outer skin having a different glass composition than said core, said nodule having an undercoating of an active pulverulent material partially embedded in the continuous outer skin and an outer coating of a liquid substrate.

2. The process according to claim 1 wherein the cellular glass nodules have an undercoating of particles of aluminum oxide embedded in the outer skin.

3. The process according to claim 2 wherein the aluminum oxide particles have a size less than 2 microns.

4. The process according to claim 1 in which the outer skin of the cellular glass nodules has a glass composition including the reaction product of sodium silicate and aluminum oxide.

5. The process according to claim 1 in which the cellular glass nodules have a size between about 40 mesh and 100 mesh.

6. The process according to claim 1 in which the cellular glass nodules are coated with a viscous petroleum fraction as a liquid substrate and remain free flowing so that the coated cellular glass nodules pack uniformly in elongated columns.

7. The process according to claim 1 in which the cellular glass nodules are coated with between about 1 and 6% by weight of a liquid substrate.

8. An apparatus for conducting gas chromatographic separations comprising an elongated column and a packing material therein wherein the improvement comprises having as a packing material spherical cellular glass nodules having a cellular core formed from a plurality of separate closed cells and a substantially continuous outer skin, said outer skin having a different glass composition than said core, said nodule having an undercoating of an active pulverulent material partially embedded in the continuous outer skin and an outer coating of a liquid substrate.

References Cited

UNITED STATES PATENTS 3,340,085  9/1967  Halasz et al. _____ 55—386 X
3,354,024  11/1967  D'Eustachio et al. ____ 161—168

JAMES L. DECESARE, Primary Examiner